US009846977B1

(12) United States Patent
Cox et al.

(10) Patent No.: US 9,846,977 B1
(45) Date of Patent: Dec. 19, 2017

(54) SYSTEMS AND METHODS FOR DETERMINING VEHICLE TRIP INFORMATION

(71) Applicant: Metromile, Inc., San Francisco, CA (US)

(72) Inventors: Evan Gabriel Turitz Cox, Pleasant Hill, CA (US); Muhammad Waliji, San Francisco, CA (US); Dan Richard Preston, Jr., San Francisco, CA (US); Jose Mercado, San Francisco, CA (US); Daniel Eric Goodman, Mountain View, CA (US); Chetan Ramaiah, San Francisco, CA (US)

(73) Assignee: METROMILE, INC., San Francisco, CA (US)

( * ) Notice: Subject to any disclaimer, the term of this patent is extended or adjusted under 35 U.S.C. 154(b) by 0 days.

(21) Appl. No.: 14/843,853

(22) Filed: Sep. 2, 2015

Related U.S. Application Data (60) Provisional application No. 62/044,992, filed on Sep. 2, 2014.

(51) Int. Cl.
*G07C 5/02* (2006.01)
*G01S 19/52* (2010.01)
*G01S 19/45* (2010.01)

(52) U.S. Cl.
CPC .......... *G07C 5/02* (2013.01); *G01S 19/45* (2013.01); *G01S 19/52* (2013.01)

(58) Field of Classification Search
CPC combination set(s) only.
See application file for complete search history.

(56) References Cited

U.S. PATENT DOCUMENTS

| 3,812,710 A | 5/1974 | Bauman et al. |
| 4,157,030 A | 6/1979 | Keely |
| 4,673,921 A | 6/1987 | Saito et al. |
| 5,303,163 A * | 4/1994 | Ebaugh .................. G07C 5/085 340/439 |
| 5,550,738 A | 8/1996 | Bailey et al. |

(Continued)

FOREIGN PATENT DOCUMENTS

| GB | 2427498 A | 12/2006 |
| WO | WO 00/17610 A1 | 3/2000 |
| WO | WO 2016/005972 A1 | 1/2016 |

OTHER PUBLICATIONS

U.S. Appl. No. 14/842,736, filed Sep. 1, 2015, Cox et al.
(Continued)

*Primary Examiner* — Edward J Pipala
(74) *Attorney, Agent, or Firm* — Wilson Sonsini Goodrich & Rosati (57) ABSTRACT

The present disclosure provides methods and systems for identifying or verifying trip information. A method for identifying or verifying a trip of a vehicle comprises detecting a presence of the vehicle with a mobile computing device of a user. The mobile computing device may be removable from the vehicle. Next, a trip start may be determined when the vehicle is detected by the mobile computing device as being present. Trip data may be recorded for a trip of the vehicle subsequent to the trip start, the trip data being based at least in part on sensor readings. A trip end that corresponds to an end of the trip of the vehicle may be detected and verified.

31 Claims, 5 Drawing Sheets

(56) References Cited

U.S. PATENT DOCUMENTS

| | | | |
|---|---|---|---|
| 5,913,917 A | 6/1999 | Murphy | |
| 5,921,199 A | 7/1999 | Gross | |
| 6,087,965 A * | 7/2000 | Murphy | G07B 13/00 340/991 |
| 6,122,572 A | 9/2000 | Yavnai | |
| 6,141,609 A * | 10/2000 | Herdeg | G07C 5/008 340/995.1 |
| 6,505,106 B1 | 1/2003 | Lawrence et al. | |
| 6,590,534 B1 | 7/2003 | Kroll et al. | |
| 6,694,258 B2 | 2/2004 | Johnson et al. | |
| 6,741,933 B1 | 5/2004 | Glass | |
| 7,532,974 B2 | 5/2009 | Sato et al. | |
| 7,937,278 B1 | 5/2011 | Cripe et al. | |
| 8,022,831 B1 | 9/2011 | Wood-Eyre | |
| 8,090,598 B2 | 1/2012 | Bauer et al. | |
| 8,180,293 B2 * | 5/2012 | Jung | H04B 5/0062 340/5.32 |
| 8,280,752 B1 | 10/2012 | Cripe et al. | |
| 8,311,858 B2 | 11/2012 | Everett et al. | |
| 8,332,242 B1 | 12/2012 | Medina, III | |
| 8,498,777 B2 | 7/2013 | Sanchez-Prieto Aler et al. | |
| 8,520,695 B1 | 8/2013 | Rubin et al. | |
| 8,527,140 B2 | 9/2013 | Schwartz et al. | |
| 8,560,216 B1 | 10/2013 | Kahn et al. | |
| 8,610,597 B2 | 12/2013 | Stefik et al. | |
| 8,793,062 B2 | 7/2014 | Fino | |
| 8,799,036 B1 | 8/2014 | Christensen et al. | |
| 8,816,879 B2 | 8/2014 | Stefik et al. | |
| 8,843,307 B1 | 9/2014 | Kolodziej | |
| 8,972,079 B2 | 3/2015 | Harumoto et al. | |
| 9,053,469 B1 | 6/2015 | Bohanek et al. | |
| 9,082,078 B2 | 7/2015 | Palmer et al. | |
| 9,230,425 B2 | 1/2016 | Hamaue et al. | |
| 9,372,831 B2 | 6/2016 | Harumoto et al. | |
| 2003/0229446 A1 | 12/2003 | Boscamp et al. | |
| 2004/0123837 A1 | 7/2004 | Rado | |
| 2004/0225557 A1 * | 11/2004 | Phelan | G01M 17/00 701/1 |
| 2005/0137757 A1 | 6/2005 | Phelan et al. | |
| 2005/0228553 A1 | 10/2005 | Tryon | |
| 2005/0240347 A1 | 10/2005 | Yang | |
| 2006/0042232 A1 | 3/2006 | Fulcher et al. | |
| 2006/0095301 A1 | 5/2006 | Gay | |
| 2006/0111835 A1 | 5/2006 | Baker et al. | |
| 2007/0083327 A1 * | 4/2007 | Brice | G06Q 10/00 701/410 |
| 2007/0123270 A1 | 5/2007 | Casey | |
| 2007/0262855 A1 | 11/2007 | Zuta et al. | |
| 2007/0294030 A1 | 12/2007 | Jones | |
| 2008/0039988 A1 | 2/2008 | Estabrook et al. | |
| 2008/0091347 A1 | 4/2008 | Tashiro | |
| 2008/0252487 A1 | 10/2008 | McClellan et al. | |
| 2008/0312969 A1 | 12/2008 | Raines et al. | |
| 2009/0098907 A1 | 4/2009 | Huntzicker et al. | |
| 2009/0309759 A1 | 12/2009 | Williams | |
| 2010/0073158 A1 | 3/2010 | Uesaka et al. | |
| 2010/0073201 A1 | 3/2010 | Holcomb et al. | |
| 2010/0106416 A1 | 4/2010 | Yochum | |
| 2010/0161209 A1 | 6/2010 | Vaghefinazari | |
| 2010/0185479 A1 | 7/2010 | Brinton et al. | |
| 2010/0238009 A1 * | 9/2010 | Cook | G06Q 10/10 340/439 |
| 2011/0022263 A1 | 1/2011 | Sanchez-Prieto Aler et al. | |
| 2011/0060600 A1 | 3/2011 | Fox et al. | |
| 2011/0106370 A1 | 5/2011 | Duddle et al. | |
| 2011/0137508 A1 | 6/2011 | Garcia Manchado | |
| 2011/0196601 A1 | 8/2011 | Miura et al. | |
| 2011/0301806 A1 | 12/2011 | Messier et al. | |
| 2011/0313647 A1 | 12/2011 | Koebler et al. | |
| 2012/0078671 A1 * | 3/2012 | Mohebbi | G06Q 10/08 705/7.12 |
| 2012/0092190 A1 | 4/2012 | Stefik et al. | |
| 2012/0095792 A1 | 4/2012 | Stefik et al. | |
| 2012/0173075 A1 | 7/2012 | Mays | |
| 2012/0191242 A1 | 7/2012 | Outwater | |
| 2012/0209634 A1 | 8/2012 | Ling et al. | |
| 2013/0006674 A1 | 1/2013 | Bowne et al. | |
| 2013/0122928 A1 | 5/2013 | Pfluger | |
| 2013/0151037 A1 | 6/2013 | Harumoto et al. | |
| 2013/0245880 A1 | 9/2013 | McQuade | |
| 2013/0317665 A1 | 11/2013 | Fernandes et al. | |
| 2013/0344856 A1 * | 12/2013 | Silver | H04M 1/72577 455/418 |
| 2014/0028477 A1 | 1/2014 | Michalske | |
| 2014/0067246 A1 | 3/2014 | Eldredge et al. | |
| 2014/0085109 A1 | 3/2014 | Stefik et al. | |
| 2014/0176348 A1 | 6/2014 | Acker, Jr. et al. | |
| 2014/0180727 A1 | 6/2014 | Freiberger et al. | |
| 2014/0236719 A1 | 8/2014 | Szostak et al. | |
| 2014/0266594 A1 | 9/2014 | Reiser | |
| 2014/0309855 A1 | 10/2014 | Tran | |
| 2015/0019266 A1 | 1/2015 | Stempora | |
| 2015/0187013 A1 | 7/2015 | Adams et al. | |
| 2015/0187019 A1 | 7/2015 | Fernandes et al. | |
| 2015/0226563 A1 | 8/2015 | Cox et al. | |
| 2015/0228129 A1 | 8/2015 | Cox et al. | |
| 2016/0033291 A1 | 2/2016 | Inoue et al. | |

OTHER PUBLICATIONS

U.S. Appl. No. 14/842,753, filed Sep. 1, 2015, Cox et al.
U.S. Appl. No. 14/843,815, filed Sep. 2, 2015, Cox et al.
Office action dated Apr. 23, 2015 for U.S. Appl. No. 14/177,188.
Office action dated Sep. 29, 2015 for U.S. Appl. No. 14/177,192.
Office action dated Dec. 18, 2015 for U.S. Appl. No. 14/177,188.
Office Action dated Nov. 28, 2016 for U.S. Appl. No. 14/842,736.
Hemminki, et al. Accelerometer-Based Transportation Mode. SenSys '13 Proceedings of the 11th ACM Conference on Embedded Networked Sensor Systems. Article No. 13. 2013. 14 pages.
Office action dated Apr. 18, 2016 for U.S. Appl. No. 14/177,192.
Office action dated Jul. 1, 2016 for U.S. Appl. No. 14/842,736.
Office action dated Aug. 17, 2016 for U.S. Appl. No. 14/843,815.
Office action dated Sep. 12, 2016 for U.S. Appl. No. 14/177,188.
Office action dated Sep. 29, 2016 for U.S. Appl. No. 14/177,192.
Reddy, et al. Using mobile phones to determine transportation modes. ACM Trans. Sensor Netw. 6, 2, Article 13 (Feb. 2010), 27 pages. DOI:10.1145/1689239.1689243 http://doi.acm.org/10.1145/1689239.1689243.
Shoaib, et al. A Survey of Online Activity Recognition Using Mobile Phones. Sensors 2015, 15, 2059-2085; doi:10.3390/s150102059.
Stenneth, et al. Transportation Mode Detection using Mobile Phones and GIS Information. ACM SIGSPATIAL GIS '11, Nov. 1-4, 2011. Chicago, IL, USA. 54-63.
Co-pending U.S. Appl. No. 15/476,549, filed Mar. 31, 2017.
Notice of Allowance dated Jul. 3, 2017 for U.S. Appl. No. 14/842,736.
Office Action dated Apr. 21, 2017 for U.S. Appl. No. 14/177,188.
Office Action dated May 10, 2017 for U.S. Appl. No. 14/177,192.
Office Action dated May 26, 2017 for U.S. Appl. No. 14/843,815.
Notice of Allowance dated Sep. 27, 2017 for U.S. Appl. No. 14/842,736.
Office Action dated Sep. 14, 2017 for U.S. Appl. No. 14/842,753.
Office Action dated Sep. 28, 2017 for U.S. Appl. No. 14/843,815.

* cited by examiner

SYSTEMS AND METHODS FOR DETERMINING VEHICLE TRIP INFORMATION

CROSS-REFERENCE

This application claims the benefit of U.S. Provisional Application No. 62/044,992, filed Sep. 2, 2014, which application is incorporated herein by reference in its entirety.

BACKGROUND

A vehicle is typically a mobile machine that transports people or cargo from one point to another. Vehicles may be manufactured, such as wagons, bicycles, motor vehicles (motorcycles, cars, trucks, buses), railed vehicles (trains, trams), watercraft (ships, boats), aircraft and spacecraft. Land vehicles may be classified broadly by what is used to apply steering and drive forces against the ground.

Vehicles increasingly rely on computers and sensors for a variety of purposes. With time, the information determined from a vehicle gets more sophisticated, and more comprehensive about a variety of aspects relating to the operation of a vehicle.

Numerous conventional approaches exist for matching a vehicle route to a map, and displaying the vehicle route on a map. Conventional approaches typically rely on global positioning system (GPS) information, with varying levels of accuracy and granularity based on the quality of the GPS information.

SUMMARY

The present disclosure provides systems and methods for utilizing a mobile computing device in a vehicle to determine vehicle information and vehicle trip information. This can be used to accurately identify or verify a trip of a vehicle.

An aspect of the present disclosure provides a method for identifying or verifying a trip of a vehicle, comprising detecting a presence of the vehicle with a mobile computing device of a user, which mobile computing device is removable from the vehicle; determining a trip start when the vehicle is detected by the mobile computing device as being present, which trip start corresponds to a start of the trip of the vehicle; recording, in computer memory, trip data for the trip of the vehicle subsequent to the trip start, the trip data being based at least in part on sensor readings of the mobile computing device; detecting a trip end that corresponds to an end of the trip of the vehicle; and verifying the trip end.

In some embodiments, detecting the presence of the vehicle includes detecting a signal from a beacon that is mounted to or provided with the vehicle. In some embodiments, the beacon is a Bluetooth Low Energy device. In some embodiments, determining the trip start includes sampling one or more sensor devices of the mobile computing device in determining that a movement of the mobile computing device satisfies a threshold criteria. In some embodiments, determining that the movement of the mobile computing device satisfies the threshold criteria comprises (i) determining a velocity of the mobile computing device at multiple sampled instances, and (ii) determining a profile of the velocity at multiple instances that satisfies the threshold criteria.

In some embodiments, detecting the trip end includes determining with the mobile computing device that the vehicle is not present. In some embodiments, verifying the trip end includes determining with the mobile computing device that a duration in which the vehicle is not present exceeds a threshold.

In some embodiments, detecting the trip end includes (i) detecting a velocity of the mobile computing device and (ii) determining that the velocity is indicative of the vehicle as having stopped. In some embodiments, verifying the trip end includes determining that a duration in which the vehicle is indicated as having stopped exceeds a threshold.

In some embodiments, the trip end is detected and/or verified using an algorithm that takes as input at least a subset of the sensor readings of the mobile computing device and outputs a probability that is indicative of the trip end. In some embodiments, the trip end is detected and/or verified using a machine learning algorithm that takes as input at least a subset of the sensor readings of the mobile computing device and outputs a probability that is indicative of the trip end.

In some embodiments, the method further comprises transmitting the trip data to a computer server in network communication with the mobile computing device. In some embodiments, the mobile computing device includes the computer memory. In some embodiments, the method further comprises determining an item of value to the user upon verifying the trip end.

In another aspect, a system for determining or providing vehicle information or vehicle trip information comprises one or more computer processors that are individually or collectively programmed to implement any of the methods above or elsewhere herein. In some embodiments, a system for identifying or verifying a trip of a vehicle comprises one or more sensors for determining a presence of the vehicle and recording trip data for the trip of the vehicle; computer memory that contains the trip data recorded during the trip of the vehicle; and a computer processor operatively coupled to the computer memory and the one or more sensors, wherein the computer processor is programmed to (i) detect the presence of the vehicle using the one or more sensors, (ii) determine a trip start when the vehicle is detected by the one or more sensors as being present, which trip start corresponds to a start of the trip of the vehicle, (iii) record, in the computer memory, trip data for the trip of the vehicle subsequent to the trip start, the trip data being based at least in part on readings of the one or more sensors, (iv) detect a trip end that corresponds to an end of the trip of the vehicle, and (v) verify the trip end.

In some embodiments, the computer processor is programmed to detect the presence of the vehicle by detecting a signal from a beacon that is mounted to or provided with the vehicle. In some embodiments, the computer memory and computer processor are part of a mobile computing device of a user, which mobile computing device is removable from the vehicle. In some embodiments, the one or more sensors are part of a mobile computing device. In some embodiments, the computer processor is programmed to determine that a movement of the mobile computing device satisfies a threshold criteria by (i) determining a velocity of the mobile computing device at multiple sampled instances, and (ii) determining a profile of the velocity at multiple instances that satisfies the threshold criteria.

In some embodiments, the computer processor is programmed to detect the trip end by determining that the vehicle is not present. In some embodiments, the computer processor is programmed to verify the trip end by determining that a duration in which the vehicle is not present exceeds a threshold.

In some embodiments, the computer processor is programmed to detect the trip end by (i) detecting a velocity of the mobile computing device and (ii) determining that the velocity is indicative of the vehicle as having stopped. In some embodiments, the computer processor is programmed to verify the trip end by determining that a duration in which the vehicle is indicated as having stopped exceeds a threshold.

In some embodiments, the computer processor is programmed to detect and/or verify the trip end using a machine learning algorithm that takes as input at least a subset of the readings from the readings of the one or more sensors and outputs a probability that is indicative of the trip end. In some embodiments, the computer processor is programmed to transmit the trip data to a computer server in network communication with the computer processor. In some embodiments, the computer processor is programmed to determine an item of value to the user upon verifying the trip end.

In another aspect, a non-transitory computer readable medium comprises machine executable code that, upon execution by one or more computer processors, implements any of the methods above or elsewhere herein. In some embodiments, a non-transitory computer-readable medium comprises machine executable code that, upon execution by one or more computer processors, implements a method for identifying or verifying a trip of a vehicle, the method comprising detecting a presence of the vehicle with a mobile computing device of a user, which mobile computing device is removable from the vehicle; determining a trip start when the vehicle is detected by the mobile computing device as being present, which trip start corresponds to a start of the trip of the vehicle; recording, in computer memory, trip data for the trip of the vehicle subsequent to the trip start, the trip data being based at least in part on sensor readings of the mobile computing device; detecting a trip end that corresponds to an end of the trip of the vehicle; and verifying the trip end.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "trip," as used herein, generally refers to an act of traveling from one point to another. A trip can include traveling to a place and returning. A trip can be made with a vehicle, such as a car, truck, motorcycle, scooter, or bicycle. A trip can be made along a route. The route can have one or more start and stop points.

The present disclosure provides methods and systems that can enable the reliable generation of vehicle trip data for a vehicle, with indication of the trip start and trip end. Such determination can be made by a mobile computing device. The mobile computing device can be on the vehicle. Examples provided herein can enable a mobile computing device to detect a vehicle's presence, and further to process sensor readings to reliably indicate trip start when the vehicle is present in proximity to the mobile computing device. Furthermore, the examples provided herein can enable the mobile computing device to reliably detect the trip end using at least one of presence detection of the vehicle and/or sensor readings from the mobile computing device.

According to embodiments described herein, a mobile computing device is operated to generate sensor readings for a vehicle trip. In an embodiment, the mobile computing device detects the vehicle to be present. When the vehicle is detected as being present, a trip start can be determined using sensor readings such as geographic location data and/or accelerometer data generated on the mobile computing device. Examples of geographic location (geolocation) data include global positioning system (GPS) system data and data from wireless triangulation. Vehicle information may be determined telematically using, for example, a combination of geolocation information (e.g., GPS information) and an electronic device (e.g., mobile computing device) in the vehicle. Trip data can be recorded for the vehicle trip, based at least in part on sensor readings of the mobile computing device. In some situations, the trip data can be supplemented by sensor readings from the vehicle. The mobile computing device can then detect a trip end using detection of the vehicle's presence and/or the sensor readings from the mobile computing device One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. The numerous machines shown with embodiments of the invention can include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

Figure 1:
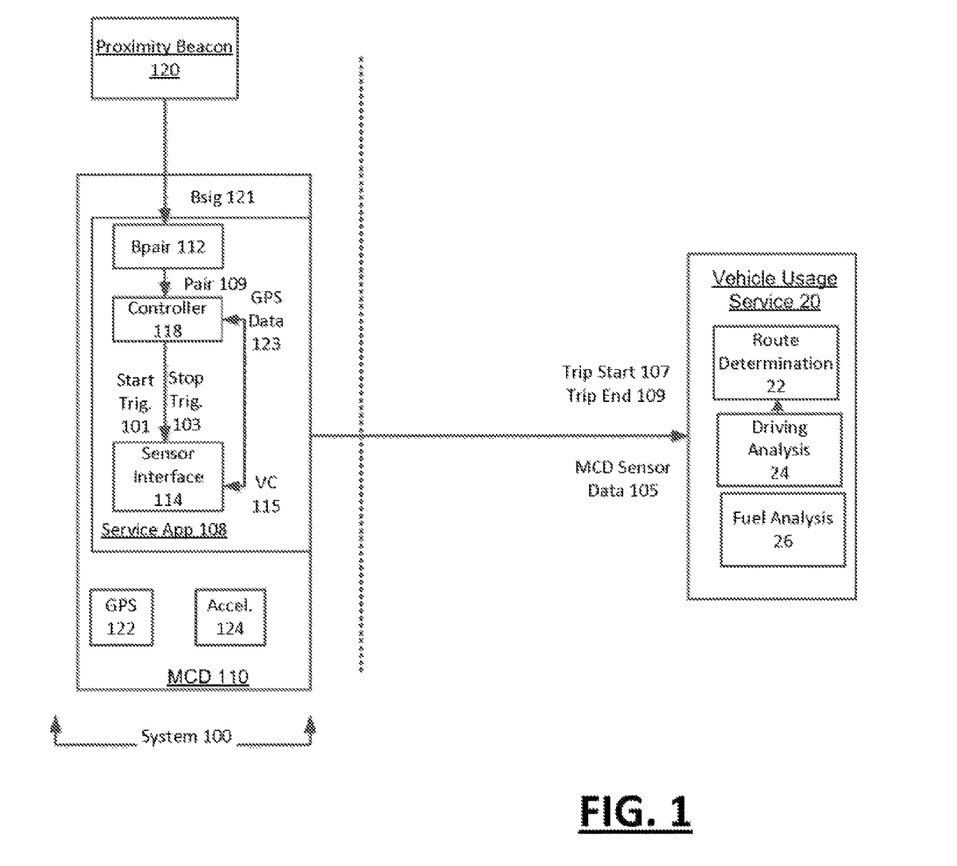
FIG. 1 illustrates a system for detecting and confirming presence of a mobile computing device in a vehicle, according to an embodiment.

FIG. 1 illustrates an example system for detecting and confirming presence of a mobile computing device, according to an embodiment. In an example of FIG. 1, system 100 includes a mobile computing device (MCD) 110 and a beacon 120. The MCD 110 operate to communicate with external services and resources. The MCD 110 can correspond to, for example, smartphone or cellular telephony/messaging device. According to some embodiments, the system 100 communicates with a vehicle usage service 20, which utilizes information provided from the MCD 110 to evaluate and analyze a vehicle and the manner in which it is in use. The system 100 can be implemented to verify that information communicated from the MCD 110 originates from, in proximity to or within the vehicle of interest while the vehicle is in motion. In the context of vehicle usage services 20, the information can be used to precisely identify trip start 107 and trip end 109 information. The trip start 107 can correspond to a start of the trip of the vehicle and the trip end 109 can correspond to an end of the trip of the vehicle. Among other benefits, the identification of trip start and trip end information provides a timeframe or boundary to validate that the readings and data communicated from MCD 110 originates from the vehicle of interest when the vehicle is on a trip. Absent such information, the transmissions of the MCD 110 could originate from movement of the MCD 110 in an environment other than the vehicle of interest.

The MCD 110 can include a user interface, such as a graphical user interface (GUI). The user interface can present information to a user (e.g., driver or passenger of the vehicle), such as vehicle information (e.g., vehicle type or fuel level) and vehicle trip information (e.g., trip start, trip end or route). The user interface can be a passive display or an active touch display (e.g., a capacitive or resistive touch screen).

The MCD 110 can be in the vehicle. The MCD 110 can be mounted in the vehicle or on the user. The MCD 110 can be removable from the vehicle. For example, the MCD 110 can be carried by a user that enters the vehicle, operates the vehicle, ceases operation of the vehicle and subsequently leaves the vehicle.

The beacon 120 can be a proximity beacon. The beacon 120 can correspond to, for example, a Bluetooth Low Energy device that continuously transmits an identifier. The beacon 120 can be mounted to a vehicle windshield or other suitable location. The MCD 110 can be paired to the beacon 120, and once paired, the MCD 110 can operate to detect transmissions from the beacon 120.

In an implementation, the MCD 110 includes a service application 108, a GPS sensor 122, and an accelerometer sensor 124. The service application 108 operates to acquire data from the mobile computing device when the vehicle is in motion. The service application 108 may interface with the GPS component 122 and/or the accelerometer 124 to record and/or transmit MCD sensor data 105. The vehicle usage service 20 can receive a transmission of MCD sensor data 105. Alternatively, functionality provided with the vehicle usage service 20 can be included with applications or other components resident on the MCD 110. Thus, for example, in variations, the MCD data 105 can be recorded and used internally by other applications running on the device.

The service application 108 includes a controller 118, a beacon pairing component 112 and a sensor interface 114. The sensor interface 114 operates to read information from one or more sensors of the MCD 110. The controller 118 implements operations to verify the presence of the device within the vehicle and to initiate and stop performance of operations based on the beacon presence detection. In operation, the beacon pairing component 112 responds to a specific beacon signal 121 that is emitted from the beacon 120. The beacon signal 121 can include an identifier of the beacon 120, which the beacon pairing component 112 can be responsive to as a result of the pairing process.

As an alternative or in addition to, the presence of the vehicle is determined using GPS and/or accelerometer data. For example, position as a function of time or acceleration or acceleration pattern may indicate that the MCD 110 is in a moving vehicle, which may indicate the presence of the vehicle.

In one implementation, beacon pairing component 112 operates as a background application that continuously listens for the beacon signal 121 of the beacon 120. Once detected, the beacon pairing component 112 can generate a trigger signal 119 that indicates it has paired to the beacon 120. In one implementation, the beacon pairing component 112 can detect a range of proximity to the beacon 120. The range approximately based on the signal strength of, for example, the Bluetooth Low Energy transmitter of the beacon. Based on the power level, the beacon pairing component 112 can, for example, determine that the proximity of the beacon 120 is either immediate, near, or far. By positioning the beacon 120 on the windshield near the driver side, the beacon pairing component 112 can detect both the proximity of the beacon 120, and the immediate placement of the beacon 120 to the MCD 110. The immediate placement of the beacon 120 to the MCD 110 can be indicative that the driver has sat in the driver seat of the vehicle.

The beacon 120 can provide the beacon signal 121 to the beacon pairing component 112. The beacon signal 121 can serve as a mechanism to trigger the controller 118 into verifying the trip start or other operating condition from which MCD 110 is to generate sensor readings and perform other operations. According to one embodiment, the pairing component 112 only registers the beacon signal 121 when the beacon signal satisfies a proximity (or strength of signal) condition, indicating, for example, the immediate proximity of the MCD 110 to the beacon 120.

The beacon pairing component 112 can generate the trigger signal 119 when the beacon signal 121 exceeds a designated signal strength. The trigger signal 119 can serve to trigger the controller 118 to determine another condition for the trip start condition to be validated-specifically, that the MCD 110 is in motion. More specifically, in one implementation, the controller 118 operates to initiate a verification check 115 to determine that (i) the MCD 110 is present within the vehicle, and (ii) the vehicle is to be operated for a trip. The verification check 115 can be implemented by the sensor interface 114, which reads sensor information from the device to indicate movement of the vehicle.

Embodiments recognize that the verification check 115 can confirm that the vehicle is moving when the beacon 120 is detected as being immediate adjacent to the MCD 110. Otherwise, the proximity of the MCD 110 and the beacon 120 can be reflective of another event, such as the user entering the vehicle, sitting in the driver seat for reasons other than driving, or even being near the vehicle.

In response to the verification check 115, the sensor interface 114 retrieves GPS data 123 from the GPS component 122. In one implementation, the GPS component 122 can be sampled over a duration of time (e.g., 30 seconds) to obtain GPS data 123 as a response to the verification check. The controller 118 can use the controller 118 to determine whether one or more predetermined criteria are satisfied. The predetermined criteria can be indicative of the trip start. In one implementation, the controller 118 determines (i) a distance the vehicle traveled during the time period from when the beacon was first detected, and/or (ii) a velocity of the vehicle at multiple instances in the duration since the beacon was detected. The velocity of the vehicle may be calculated by determining a velocity (e.g., average velocity across multiple time points) of the MCD 110 and associating the velocity of the MCD 110 with the velocity of the vehicle. By way of example, the velocity criteria can correspond to a velocity determination between adjacent sets of sampled points from the GPS 122. The controller 118 can specify the sensitivity of the GPS 122 to be, for example, 10 meters, and further that the GPS component 122 is to signal a notification when the distance traveled from a point specified by the controller is more than 100 meters. The criteria for determining movement can individually or collectively indicate movement of the MCD 110 in a coherent direction. As an alternative or addition, the controller 118 can use output from another sensor, such as the accelerometer 124. However, the accelerometer 124 can sometimes provide unreliable data, given the vulnerability for the MCD 110 to move or jostle.

If the data from the sensor interface 114 indicates the threshold has been met, then the beacon pairing 112 verifies that the MCD 110 is within the vehicle and that the vehicle is in motion. If the data from the GPS component 122 does not indicate the threshold has been met, then the controller 118 can operate to check and recheck the GPS data 123 until either (i) the threshold has been met, or (ii) the MCD 110 ceases to detect the beacon 120. Thus, for example, when the user enters a vehicle, the MCD 110 can detect the beacon 120, and the controller 118 can initiate the verification 115. However, it takes some time for the user to start the vehicle, and further to enter the roadway. If GPS component 122 is being used, the GPS signal may also be inoperative when the vehicle is in the garage. These and other factors can delay the controller 118 in receiving data indicating vehicle movement. Accordingly, the controller 118 may continue to check for GPS data 123 until the threshold is met or the MCD 110 ceases to detect the beacon 120.

Once criteria is met so that the MCD 110 is verified to be in a moving vehicle, the controller 118 implements operations to control the performance of the service application 108 (or other processes of the MCD 110) in obtaining and communicating sensor data to, for example, the vehicle usage service 20. The service application 108 can communicate MCD sensor data 105 and other information to the vehicle usage service 20. The MCD sensor data 105 can include data that identifies, or otherwise it interpretable as the trip start 107. The trip start 107 can correspond to an initial position and/or time for a detected trip of the vehicle. In one implementation, the trip start can coincide with the position and instance in time when the beacons signal 121 is first detected by the pairing component 112. In another implementation, the trip start can coincide with a position and time when the sensor readings indicating coherent motion exceed a threshold. After the trip start 107, the MCD sensor data 105 can also include additional position information for the vehicle as it moves.

The MCD sensor data 105 can also include data from an accelerometer or other sensor information obtained by the sensors of the MCD 110 while the vehicle is in motion.

The vehicle usage service 20 can perform a variety of functions and services using the MCD sensor data 105. By way of example, the vehicle usage service 20 can include route analysis 22, which includes functionality to analyze the routes of a driver (e.g., best routes to take to conserve gas). The vehicle usage service 20 can also include driving analysis 24, which identifies the driving habits of the user (e.g., braking habits, speed profiles, etc.) An example of route analysis 22 and driving analysis 24 is provided with U.S. Patent Publication Nos. 2015/0226563 and 2015/0228129, each of which is entirely incorporated herein by reference. As other examples, the vehicle usage service 20 can include fuel analysis 26, to perform functions such as providing fuel estimations and/or fueling recommendations to the driver. In the context provided, accurate trip start 107 and/or trip end 109 information can enable use of the MCD 110 to collect trip data for vehicle services, without use of other sensor devices that may interface with the vehicle (e.g., to obtain on-board diagnostics data).

In one embodiment, the controller 118 assumes the trip start continues until conditions for a trip end 109 are detected. The trip end 109 can be signified by separate criteria, such as (i) the pairing component 112 ceasing detection of the beacon 120, and (ii) the MCD 110 detecting movement that is below one or more designated criteria. For example, the pairing component 112 may decouple from the beacon 120 for incidental reasons, with the MCD 110 being unmoved.

The controller 118 can also include logic to verify when the trip end occurs. Accordingly, in one implementation, if the controller 118 determines that the beacon 120 is not detected, the controller 118 may wait a designated threshold of time to see if the reconnection is made. If the reconnection is made, the temporary disconnection can be deemed a connection failure. If the reconnection is not made, then the assumption can be made that the MCD 110 separated from the vehicle. The time and position for the trip end can be determined as when the beacon 120 was first detected as being not present.

Additionally, if MCD 110 position information indicates a vehicle stop, then the controller 118 can wait to determine if the position information indicates that the vehicle is in motion again before a second threshold in time is reached. The second threshold in time can be measured as a time that is deemed likely to indicate the driver having left the vehicle (e.g., 15 minutes or thirty minutes). Once the trip end is detected, the actual point of the trip end can be deemed to be the instance of time when the vehicle was determined to first stop.

The trip end 109 can be signaled to the vehicle usage service 20. Once received, the vehicle usage service 20 can frame its analysis for MCD data 105 received during the trip.

The presence of the vehicle may be determined by the MCD 110 using the beacon 120. In some cases, the presence of the vehicle may be determined by the MCD 110 without using the beacon 120. In such a case, the MCD 110 can have one or more sensors selected from a GPS, an accelerometer, a gyroscope, an audio sensor and a magnetic field sensor (e.g., magnetometer). The magnetic field sensor may be, for examples, a microelectromechanical (MEMS) based sensor. The one or more sensors of the MCD 110 can detect vehicle or driving information, including one or more of whether the vehicle is moving, whether the user is driving the vehicle, trip start, trip end, whether the driver has implemented a hard brake (e.g., braking in response to an unexpected event), whether the vehicle is moving at or below a predetermined speed (e.g., whether the vehicle is speeding), the make and model of the vehicle, and an identify of the user.

Trip start 107 and trip end 109 can be determined by sampling one or more sensors of the MCD 110. This can be used to determine whether or not a movement of the MCD 110 satisfies threshold criteria. As an alternative or in addition to, the trip start 107 and trip end 109 can be determined by constructing and using an algorithm (e.g., machine learning algorithm) that takes as input raw sensor data and outputs vehicle or driving information, such as trip start, trip end, a probability that the MCD 110 is in a moving vehicle, a probability that the vehicle is a particular type (e.g., make and model) of vehicle, or whether the vehicle has implemented a hard brake. In some examples, the algorithm splits the sensor time series into overlapping segments (e.g., about 5-second segments), computes features of each segment (e.g., Fourier Transform and sample statistics), and then builds a classifier, for example, using an algorithm for classification, regression and other tasks that operates by constructing a multitude of decision trees at training time and outputting the class that is the mode of the classes (classification) or mean prediction (regression) of the individual trees (e.g., random forest). The algorithm may be a machine learning algorithm. The algorithm may be a trained algorithm. For classifying events, such as trip start and/or trip end, the output of the classifier may be directed into a stochastic model, such as a Markov model (e.g., hidden Markov model).

As an alternative or in addition to, a convolution neural network can be used to determine vehicle or driving information, such as classifying the type of vehicle that is being driven from sensor data. Sensor time series may be transformed into spectrograms (e.g., images) and then the convolutional neural network may be trained on the spectrograms.

The determination of accurate trip start and trip end information can provide various benefits. For example, a user may be able to accurately identify trip information, which may enable various uses, such as determination of mileage.

In some examples, accurate trip start and trip end information may enable accurate determination of an item of value to the user. In an example, vehicle insurance or insurance savings is accessed on a distance (e.g., per mile) basis, and accurate trip start and trip end can enable the accurate determination of distance traveled (e.g., from the average velocity of the vehicle). This can enable the user to benefit from save driving, for example.

Methods

Figure 2:
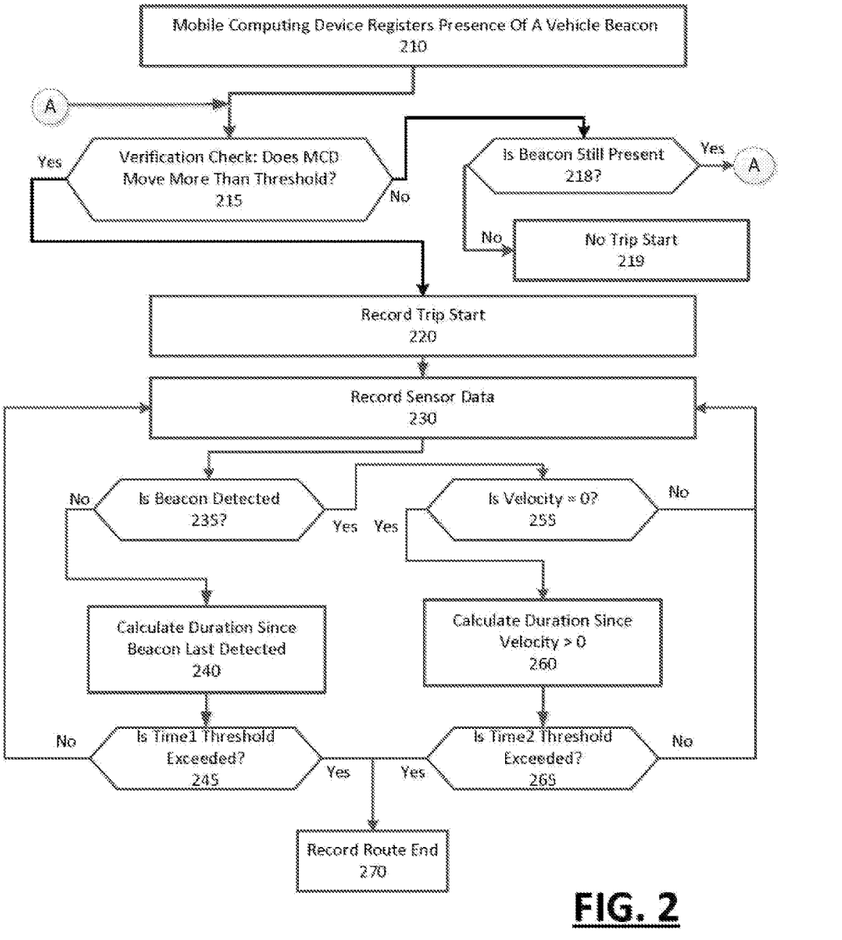
FIG. 2 illustrates an example method for determining a trip start and trip end using vehicle presence detection and sensor readings of a mobile computing device, according to an embodiment.
Figure 3:
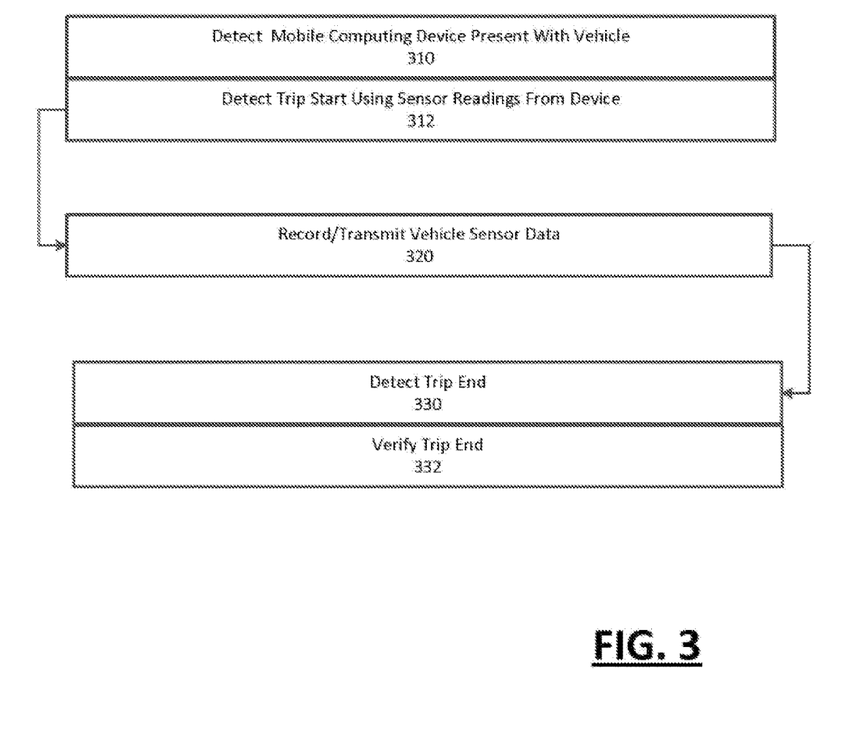
FIG. 3 illustrates an example method for using a mobile computing device to generate trip data for a vehicle trip, according to an embodiment.

FIG. 2 illustrates an example method for determining a trip start and trip end using vehicle presence detection and sensor readings of a mobile computing device, according to an embodiment. FIG. 3 illustrates an example method for using a mobile computing device to generate trip data for a vehicle trip, according to an embodiment. An example method such as described with FIG. 2 or FIG. 3 can be implemented using components such as described with examples of FIG. 1. Accordingly, in describing an example method of FIG. 2 or FIG. 3, reference may be made to elements of FIG. 1 for purpose of illustrating a suitable component for performing a step or sub-step being described.

With reference to FIG. 2, a mobile computing device registers presence of a vehicle beacon 120 (210). In one implementation, MCD 110 is Bluetooth enabled, and the beacon 120 is a Bluetooth Low Energy device. The two devices can be paired at an initial time, then the MCD 110 can detect the beacon 120 in the future using a background application process (e.g., beacon pairing component 112). In one implementation, the MCD 110 registers the presence of the beacon 120 when the signal strength of the beacon signal 121 exceeds a designated threshold (e.g., indicating immediate proximity) (212). Thus, the MCD 110 may register the beacon's presence at some point after the beacon 120 is first detected.

When the MCD 110 registers presence of the beacon 120, a verification determination can be made as to whether the MCD 110 moves more than a predetermined threshold (215). The determination can be based on, for example, the controller 118 of the service application 108 verifying the vehicle is moving by way of reading and interpreting sensor data from the MCD 110. The sensor data can be analyzed for a pattern, value or other threshold that indicates the vehicle moved in a particular direction. In one implementation, the controller 118 performs a verification using GPS data. The predetermined threshold for applying the GPS data can include (i) total distance traveled in a given period, or (ii) a sustained and/or increasing velocity (e.g., average velocity) at multiple sampled instances when the GPS data is read. As an alternative or addition, the controller 118 performs a verification using accelerometer information. The accelerometer information can indicate, for example, a sustained acceleration in a particular direction that is indicative of a velocity or a velocity change (e.g., velocity increase or velocity decrease).

If the verification determination is that the predetermined threshold is not met, then a determination can be made as to whether the MCD 110 still registers the beacon (218). If the beacon is still registered, then the verification determination is made again (215). If the beacon is not registered, the process ends under the assumption that no trip start took place (219).

If the verification determination is that the predetermined threshold is met, the MCD 110 records a trip start (220). Depending on the implementation, the trip start can be determined from the time when the presence of the beacon 120 was first registered, or some point after (e.g., when the verification threshold was met).

The MCD 110 can also record vehicle sensor data pertaining to movement of the device (230). The MCD 110 can, for example, read GPS data and/or accelerometer information from the sensors of the MCD 110. In some implementations, the trip start and the recorded information can be communicated to other services. For example, the MCD 110 can communicate the GPS information, the accelerometer information and timing information to the vehicle services 20 over a network.

The MCD 110 can detect or repeatedly check for presence of the beacon 120 (235) while recording the sensor data. Examples recognize that wireless devices sometimes stop communicating or detecting one another, at least for brief instances. Accordingly if the beacon 120 is not detected, then the MCD 110 waits and calculates the total duration from when the beacon 120 was last detected (240). A determination can be made as to whether the non-detection duration exceeds a given threshold (245). If the non-detection duration is less than the threshold, then the sensor data is continued to be recorded (230), and the determination of whether the beacon is present is done again (235). Else, if the non-detection duration exceeds the threshold, then the trip end is signaled (270). Thus, the trip end can be identified when the beacon 120 is undetected even when the MCD 110 records velocity. For example, the MCD 110 can detect trip end when the user exits the vehicle (beacon 120 no longer detected), but then takes another transport or walks fast in a given direction. In some variations, however, the presence of velocity can weight the determination. For example, the threshold of (245) can be increased when there is velocity. Still further, the presence of a particular velocity profile can further weight or preclude the determination of (245). For example, if the vehicle is driven at constant velocity when the beacon 120 goes undetected, then the assumption can be made that the trip is ongoing until the vehicle ends.

When the beacon is detected as present, the trip end may still be signified by the vehicle stopping for an extended duration. Thus, if the determination of (235) is that the beacon is detected, a determination can also be made as to whether the mobile computing device movement indicates that the vehicle has stopped (255). If the vehicle is not stopped, sensor data is continued to be recorded (230). Else, if the vehicle is stopped, the duration in which the vehicle is stopped can be calculated (260). Another determination can be made as to whether the duration of the vehicle stopping exceeds a second predetermined threshold (265). If the duration of the vehicle stopping exceeds a second threshold, the trip end is recorded (270). Else, if the duration of the vehicle stopping does not exceed a second threshold, the sensor dad the vehicle can continue to be recorded at (230).

With reference to FIG. 3, an indication is generated of the MCD being in presence of a vehicle (310). The presence of the MCD 110 within the vehicle can be monitored for a trip start. According to one aspect, the indication of the trip start can be determined by processing sensor readings of the MCD 110 (312). The sensor readings can be used to indicate coherent movement of the MCD 110. For example, the MCD 110 can detect the beacon 120, and sensor information from the MCD 110 can confirm that the device is moving. The MCD 110 can thus verify the trip start by measuring sensor readings indicating coherent movement of the vehicle in a given direction when the MCD 110 is detected as being present within the vehicle.

Once the trip start as indicated, sensor readings from the MCD 110 can be recorded, processed and/or transmitted (320). For example, sensor data from the MCD 110 can be communicated to the vehicle serviced 20, operating on a network. The transmitted information can include the trip start (e.g., position and time of trip start), as well as subsequent sensor readings such as GPS readings and accelerometer information. As mentioned with some other examples, the trip start can be detected after sensor readings corresponding to the movement of the device are being taken.

The trip end can subsequently be detected from the MCD 110 (330). The detection of the trip end can be based on either the MCD being detected as not present in the vehicle, or the vehicle stopping. Once detected, the trip can be verified (332). The verification can be based on sensor readings (e.g., sensor readings indicating vehicle has zero velocity for a first duration of time) and/or failure to detect the MCD 110 within the vehicle for a second duration of time.

The sensor readings from the MCD 110, including GPS information and/or accelerometer information, can be communicated or otherwise used as part of a vehicle service. In one implementation, the MCD 110 stores the trip data for subsequent use. In a variation, the MCD device 110 communicates the trip data in real-time to, for example, where the information can be used for providing vehicle services (fuel consumption, route guidance, etc.).

Methods for determining vehicle and/or trip information, such as trip start, trip end and/or trip verification, as disclosed herein, may have various benefits. For example, in situations in which a route and/or distance traveled is used to determine insurance or warranty (e.g., per-mile insurance or warranty of a vehicle), an accurate determination of the route or distance traveled may be used to provide an item of value (e.g., money or credit) to a user that may otherwise be lost when accurate route or distance information is not available.

Computer Systems

Figure 4:
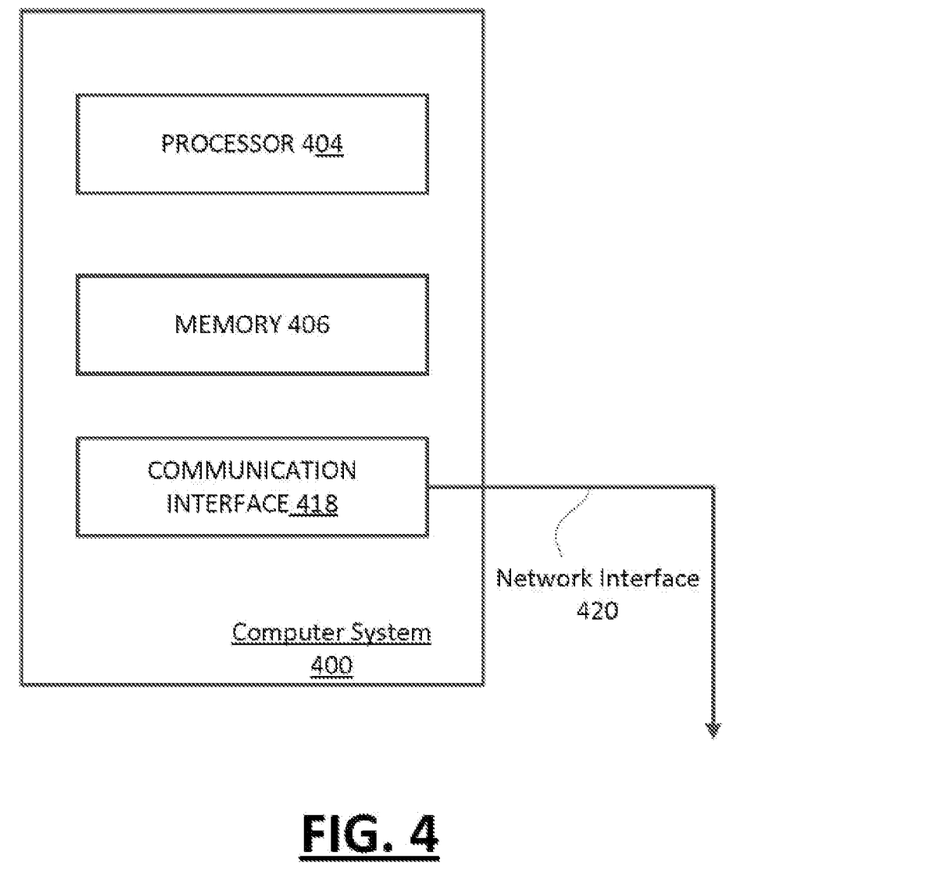
FIG. 4 illustrates a computer system on which one or more embodiments can be implemented.

FIG. 4 is a block diagram that illustrates a computer system upon which embodiments described herein may be implemented. For example, a system such as described with FIG. 1 can be implemented on a computer system such as described with an example of FIG. 4. Likewise, a method such as described with an example of FIG. 2 or FIG. 3 can also be implemented using a computing system such as described with FIG. 4.

In an embodiment, computer system 400 includes processor 404, memory 406 (including non-transitory memory), storage device, and a communication interface 418. The memory 406 can include random access memory (RAM) or other dynamic storage resources, for storing information and instructions to be executed by processor 404. The memory 406 also may be used for storing temporary variables or other intermediate information during execution of instructions to be executed by processor 404. The memory 406 may also include a read only memory (ROM) or other static storage device for storing static information and instructions for processor 404. The memory 406 can include a storage device, such as a magnetic disk or optical disk, is provided for storing information and instructions. The communication interface 418 may enable the computer system 400 to communicate with one or more networks through use of the network link 420 (wireless or wireline).

In one implementation, memory 406 may store instructions for implementing functionality such as described with an example of FIG. 1, or implemented through an example method such as described with FIG. 2 or FIG. 3. Likewise, the processor 404 may execute the instructions in providing functionality as described with a system such as described with FIG. 1, or with an example method such as described with FIG. 2 or FIG. 3.

Embodiments described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments described herein. Thus, embodiments described are not limited to any specific combination of hardware circuitry and software.

Figure 5:
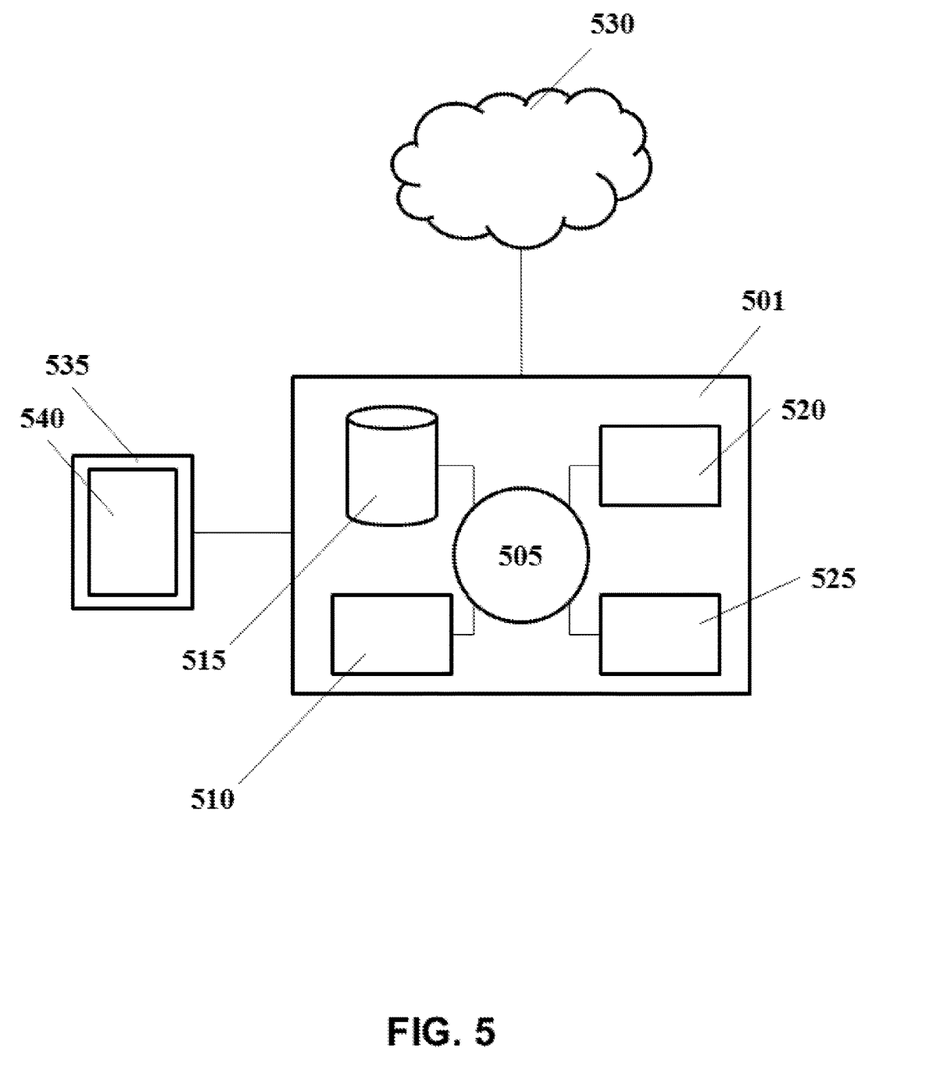
FIG. 5 schematically illustrates a computer system that is programmed or otherwise configured to implement methods of the present disclosure.

FIG. 5 shows another computer system 501 that is programmed or otherwise configured to implement methods and systems of the present disclosure, such as determining and providing vehicle information or vehicle trip information. The computer system 501 can regulate various aspects of methods and systems of the present disclosure. The computer system 501 can be the MCD 110. As an alternative, the computer system 501 can be a computer server.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., operator or passenger of a vehicle). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, vehicle information or vehicle trip information. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, determine vehicle information (e.g., vehicle type or fuel level) and vehicle trip information (e.g., trip start, trip end or route). The algorithm may be a machine learning algorithm (e.g., support vector machine), which may use user feedback to improve the determination of vehicle information and vehicle trip information. The UI 540 may include graphical elements that permit the user to provide feedback. For example, the computer system 501 may query the user about whether a trip has started or ended, and the user can provide the computer system an indication as to whether the trip has started or ended, which can enable the computer system to improve the algorithm to predict trip start and trip end. This can permit the computer system 501 to use the feedback to improve the manner in which the computer system 501 provides such information.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for determining insurance for a vehicle on a per-unit distance basis to provide insurance to a user, comprising:
   detecting a presence of the vehicle with a mobile computing device of the user by detecting a signal from a beacon that is mounted or installed in the vehicle, which mobile computing device and the beacon are removable from the vehicle;
   determining a trip start using sensor readings from the mobile computing device when the vehicle is detected by the mobile computing device as being present, which trip start corresponds to a start of the trip of the vehicle;
   recording, in computer memory, trip data for the trip of the vehicle subsequent to the trip start, the trip data being based at least in part on sensor readings of the mobile computing device;
   detecting a trip end that corresponds to an end of the trip of the vehicle;
   subsequent to detecting the trip end, verifying the trip end and presenting the trip data, including the trip start and the trip end, on a graphical user interface of the mobile computing device; and
   using the trip data, including the trip start and the trip end, to calculate the insurance for the vehicle on the per-unit distance basis.

2. The method of claim 1, wherein the beacon is a Bluetooth Low Energy device.

3. The method of claim 1, wherein determining the trip start includes sampling one or more sensor devices of the mobile computing device in determining that a movement of the mobile computing device satisfies a threshold criteria.

4. The method of claim 3, wherein determining that the movement of the mobile computing device satisfies the threshold criteria comprises (i) determining a velocity of the mobile computing device at multiple sampled instances, and (ii) determining a profile of the velocity at multiple instances that satisfies the threshold criteria.

5. The method of claim 1, wherein detecting the trip end includes determining with the mobile computing device that the vehicle is not present.

6. The method of claim 5, wherein verifying the trip end includes determining with the mobile computing device that a duration in which the vehicle is not present exceeds a threshold.

7. The method of claim 1, wherein detecting the trip end includes (i) detecting a velocity of the mobile computing device and (ii) determining that the velocity is indicative of the vehicle as having stopped.

8. The method of claim 7, wherein verifying the trip end includes determining that a duration in which the vehicle is indicated as having stopped exceeds a threshold.

9. The method of claim 1, wherein the trip end is detected and/or verified using an algorithm that takes as input at least a subset of the sensor readings of the mobile computing device and outputs a probability that is indicative of the trip end.

10. The method of claim 1, wherein the trip end is detected and/or verified using a machine learning algorithm that takes as input at least a subset of the sensor readings of the mobile computing device and outputs a probability that is indicative of the trip end.

11. The method of claim 1, further comprising transmitting the trip data to a computer server in network communication with the mobile computing device.

12. The method of claim 1, wherein the mobile computing device includes the computer memory.

13. The method of claim 1, further comprising determining an item of value to the user upon verifying the trip end.

14. The method of claim 1, further comprising presenting the trip data, including the trip start and the trip end, on the mobile computing device.

15. The method of claim 1, further comprising using the trip data for providing vehicle services, including fuel consumption and route guidance.

16. The method of claim 1, wherein a type of vehicle being driven is detected and/or verified using a convolutional neural network that takes as input at least a subset of the sensor readings of the mobile computing device.

17. A system for determining insurance for a vehicle on a per-unit distance basis to provide insurance to a user, comprising:
a mobile computing device comprising one or more sensors for detecting a presence of the vehicle by detecting a signal from a beacon that is mounted or installed in the vehicle, and recording trip data for the trip of the vehicle, which mobile computing device and beacon are removable from the vehicle;
computer memory that contains the trip data recorded during the trip of the vehicle; and
a computer processor operatively coupled to the computer memory and the one or more sensors, wherein the computer processor is programmed to (i) detect the presence of the vehicle using the one or more sensors by detecting a signal from the beacon, (ii) determine a trip start when the vehicle is detected by the one or more sensors as being present, which trip start corresponds to a start of the trip of the vehicle, (iii) record, in the computer memory, trip data for the trip of the vehicle subsequent to the trip start, the trip data being based at least in part on readings of the one or more sensors, (iv) detect a trip end that corresponds to an end of the trip of the vehicle, (v) subsequent to detecting the trip end, verify the trip end and present the trip data, including the trip start and the trip end, on a graphical user interface of the mobile computing device, and (vi) use the trip data, including the trip start and trip end, to calculate the insurance for the vehicle on the per-unit distance basis.

18. The system of claim 17, wherein the computer memory and computer processor are part of a mobile computing device of a user, which mobile computing device is removable from the vehicle.

19. The system of claim 18, wherein the one or more sensors are part of a mobile computing device.

20. The system of claim 18, wherein the computer processor is programmed to determine that a movement of the mobile computing device satisfies a threshold criteria by (i) determining a velocity of the mobile computing device at multiple sampled instances, and (ii) determining a profile of the velocity at multiple instances that satisfies the threshold criteria.

21. The system of claim 17, wherein the computer processor is programmed to detect the trip end by determining that the vehicle is not present.

22. The system of claim 21, wherein the computer processor is programmed to verify the trip end by determining that a duration in which the vehicle is not present exceeds a threshold.

23. The system of claim 17, wherein the computer processor is programmed to detect the trip end by (i) detecting a velocity of the mobile computing device and (ii) determining that the velocity is indicative of the vehicle as having stopped.

24. The system of claim 23, wherein the computer processor is programmed to verify the trip end by determining that a duration in which the vehicle is indicated as having stopped exceeds a threshold.

25. The system of claim 17, wherein the computer processor is programmed to detect and/or verify the trip end using a machine learning algorithm that takes as input at least a subset of the readings from the readings of the one or more sensors and outputs a probability that is indicative of the trip end.

26. The system of claim 17, wherein the computer processor is programmed to transmit the trip data to a computer server in network communication with the computer processor.

27. The system of claim 17, wherein the computer processor is programmed to determine an item of value to the user upon verifying the trip end.

28. The system of claim 17, wherein the computer processor is further programmed to present the trip data, including the trip start and the trip end, on the mobile computing device.

29. The system of claim 17, wherein the computer processor is further programmed to use the trip data to provide vehicle services, including fuel consumption and route guidance.

30. The system of claim 17, wherein the computer processor is further programmed to detect and/or verify a type of vehicle being driven using a convolutional neural network that takes as input at least a subset of the sensor readings of the mobile computing device.

31. A non-transitory computer-readable medium comprising machine executable code that, upon execution by one or more computer processors, implements a method for determining insurance for a vehicle on a per-unit distance basis to provide insurance to a user, the method comprising:

detecting a presence of the vehicle with a mobile computing device of the user by detecting a signal from a beacon that is mounted or installed in the vehicle, which mobile computing device and the beacon are removable from the vehicle;

determining a trip start using sensor readings from the mobile computing device when the vehicle is detected by the mobile computing device as being present, which trip start corresponds to a start of the trip of the vehicle;

recording, in computer memory, trip data for the trip of the vehicle subsequent to the trip start, the trip data being based at least in part on sensor readings of the mobile computing device;

detecting a trip end that corresponds to an end of the trip of the vehicle;

subsequent to detecting the trip end, verifying the trip end and presenting the trip data, including the trip start and the trip end, on a graphical user interface of the mobile computing device; and using the trip data, including the trip start and the trip end, to calculate the insurance for the vehicle on the per-unit distance basis.

\* \* \* \* \*